(12) United States Patent
Muramoto (10) Patent No.: US 11,460,697 B2
(45) Date of Patent: Oct. 4, 2022

(54) IMAGE GENERATION DEVICE, IMAGE DISPLAY SYSTEM, AND INFORMATION PRESENTATION METHOD

(71) Applicant: Sony Interactive Entertainment Inc., Tokyo (JP)

(72) Inventor: Junichi Muramoto, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 2 days.

(21) Appl. No.: 16/843,186

(22) Filed: Apr. 8, 2020

(65) Prior Publication Data

US 2020/0341275 A1    Oct. 29, 2020

(30) Foreign Application Priority Data

Apr. 23, 2019    (JP) .............................. JP2019-082184

(51) Int. Cl.

| | |
|---|---|
| G09G 5/00 | (2006.01) |
| G02B 27/01 | (2006.01) |
| G06F 3/01 | (2006.01) |
| G06T 19/00 | (2011.01) |
| A63F 13/212 | (2014.01) |
| A63F 13/52 | (2014.01) |
| A63F 13/537 | (2014.01) |
| A63F 13/211 | (2014.01) |
| A63F 13/40 | (2014.01) |

(52) U.S. Cl.
CPC .......... *G02B 27/017* (2013.01); *A63F 13/211* (2014.09); *A63F 13/212* (2014.09); *A63F 13/40* (2014.09); *A63F 13/52* (2014.09); *A63F 13/537* (2014.09); *G06F 3/012* (2013.01); *G06T 19/006* (2013.01)

(58) Field of Classification Search
CPC .......... G02B 27/017; G02B 2027/0187; G06F 3/012; G06F 3/011; G06F 3/0346; G06T 19/006; A63F 13/212; A63F 13/52; A63F 13/537; A63F 13/211; A63F 13/40; A63F 13/56; A63F 13/65; A63F 2300/8082; A63F 13/213; A63F 13/25
USPC ................... 345/8, 633, 7, 156, 161; 468/31
See application file for complete search history.

(56) References Cited

U.S. PATENT DOCUMENTS

| | | | |
|---|---|---|---|
| 10,599,707 B1 * | 3/2020 | Cronin | G06F 16/168 |
| 10,949,054 B1 * | 3/2021 | Cronin | G06F 3/04815 |
| 11,045,725 B1 * | 6/2021 | Sawyer | G06F 3/0346 |
| 2016/0330522 A1 * | 11/2016 | Newell | G06F 21/604 |

(Continued)

*Primary Examiner* — Thuyn Pardo
(74) *Attorney, Agent, or Firm* — Katten Muchin Rosenman LLP (57) ABSTRACT

Disclosed herein is an image generation device including: a space construction section that constructs a virtual world to be displayed on a head-mounted display; an image generation section that generates, based on a position and a posture of a head of a player wearing the head-mounted display, a display image representing the virtual world in a field of view corresponding to a point of view of the player, and causes the head-mounted display to display the generated display image; and a visitor information acquisition section that acquires information regarding presence of a visitor without a head-mounted display in a space where the player is able to move. While the visitor is present, the space construction section displays an object indicating the presence of the visitor at a corresponding position in the virtual world.

10 Claims, 9 Drawing Sheets

(56) References Cited

U.S. PATENT DOCUMENTS

| | | | |
|---|---|---|---|
| 2017/0249019 A1* | 8/2017 | Sawyer | G06F 3/0346 |
| 2018/0005429 A1* | 1/2018 | Osman | G06T 19/006 |
| 2019/0070506 A1* | 3/2019 | Stafford | A63F 13/211 |
| 2019/0094981 A1* | 3/2019 | Bradski | G06F 3/017 |
| 2019/0143223 A1* | 5/2019 | Tamiya | A63F 13/52 |
| | | | 463/31 |
| 2019/0147664 A1* | 5/2019 | Watanabe | A63F 13/25 |
| | | | 345/633 |
| 2019/0250773 A1* | 8/2019 | Miyaki | G06F 3/0482 |
| 2020/0005486 A1* | 1/2020 | Sinha | G06T 7/337 |
| 2020/0098190 A1* | 3/2020 | Goergen | G06F 3/011 |
| 2021/0103340 A1* | 4/2021 | Bradski | A63F 13/00 |

* cited by examiner

IMAGE GENERATION DEVICE, IMAGE DISPLAY SYSTEM, AND INFORMATION PRESENTATION METHOD

CROSS REFERENCE TO RELATED APPLICATIONS

This application claims the benefit of Japanese Priority Patent Application JP 2019-082184 filed Apr. 23, 2019, the entire contents of which are incorporated herein by reference.

BACKGROUND

The present disclosure relates to an image generation device configured to generate an image to be displayed on a head-mounted display, to an image display system, and to an information presentation method employed thereby.

Image display systems for watching a target space from a freely-selected point of view are widely used. For example, image display systems are developed to display panoramic video in accordance with a gaze direction of a user wearing a head-mounted display and rotating a user's head. Using a head-mounted display makes it possible to enhance the sense of immersion into video and improve the operability of applications such as games. Further, some attractions are implemented for practical applications in order to allow a user wearing a head-mounted display to experience free-roam virtual reality, which enables the user to virtually walk around in a space displayed as a video image when the user physically moves.

SUMMARY

When a user wears a non-transmissive head-mounted display, which blocks all outside light, it is obvious that the user is unable to experience the state of the outside world. When, for example, a free-roam attraction is used, it is possible to recognize initially existing items and other players in a play area due to virtual world settings. However, it is difficult to recognize an unexpected situation such as equipment failure in the play area or poor player health. If, for example, a staff member enters the play area in an attempt to cope with such an unexpected situation, the staff member becomes an obstacle to increase the level of danger.

The present disclosure has been made in view of the above circumstances, and it is desirable to provide a technology for increasing the level of safety during a movement of a user wearing a head-mounted display.

According to an embodiment of the present disclosure, there is provided an image generation device including: a space construction section that constructs a virtual world to be displayed on a head-mounted display; an image generation section that generates, based on a position and a posture of a head of a player wearing the head-mounted display, a display image representing the virtual world in a field of view corresponding to a point of view of the player, and causes the head-mounted display to display the generated display image; and a visitor information acquisition section that acquires information regarding presence of a visitor without a head-mounted display in a space where the player is able to move. While the visitor is present, the space construction section displays an object indicating the presence of the visitor at a corresponding position in the virtual world.

According to another embodiment of the present disclosure, there is provided an image display system including an image generation device, a head-mounted display, and a sensor. The image generation device includes: a space construction section that constructs a virtual world to be displayed on the head-mounted display; an image generation section that generates, based on a position and a posture of a head of a player wearing the head-mounted display, a display image representing the virtual world in a field of view corresponding to a point of view of the player, and causes the head-mounted display to display the generated display image; and a visitor information acquisition section that acquires information regarding presence of a visitor without a head-mounted display in a space where the player is able to move. While the visitor is present, the space construction section displays an object indicating the presence of the visitor at a corresponding position in the virtual world. The head-mounted display displays an image outputted from the image generation device. The sensor detects the visitor and transmits data on the visitor to the image generation device.

According to a further embodiment of the present disclosure, there is provided an image display system including an image generation device, a head-mounted display, and an input device. The image generation device includes: a space construction section that constructs a virtual world to be displayed on a head-mounted display; an image generation section that generates, based on a position and a posture of a head of a player wearing the head-mounted display, a display image representing the virtual world in a field of view corresponding to a point of view of the player, and causes the head-mounted display to display the generated display image; and a visitor information acquisition section that acquires information regarding presence of a visitor without a head-mounted display in a space where the player is able to move. While the visitor is present, the space construction section displays an object indicating the presence of the visitor at a corresponding position in the virtual world. The visitor information acquisition section detects the visitor's entry into and exit from a stay area preset in the space. While the visitor is present in the stay area, the space construction section displays an object representing a region corresponding to the stay area as the object indicating the presence of the visitor. The head-mounted display displays an image outputted from the image generation device. The input device inputs an operation indicative of the visitor's entry into and exit from the stay area, and transmits information regarding the visitor's entry into and exit from the stay area to the image generation device.

According to a yet further embodiment of the present disclosure, there is provided an information presentation method of an image generation device, including: constructing a virtual world to be displayed on a head-mounted display; generating, based on a position and a posture of a head of a player wearing the head-mounted display, a display image representing the virtual world in a field of view corresponding to a point of view of the player, and causing the head-mounted display to display the generated display image; acquiring information regarding presence of a visitor without a head-mounted display in a space where the player is able to move; and displaying an object indicating the presence of the visitor at a corresponding position in the virtual world while the visitor is present.

Any combinations of the foregoing constituent elements and any conversions of expressions of the embodiments of the present disclosure, for example, between methods, devices, systems, computer programs, data structures, and recording media are also valid modes of the present disclosure.

According to the embodiments of the present disclosure, it is possible to increase the level of safety during a movement of a user wearing a head-mounted display.

DETAILED DESCRIPTION OF THE PREFERRED EMBODIMENT

Figure 1:
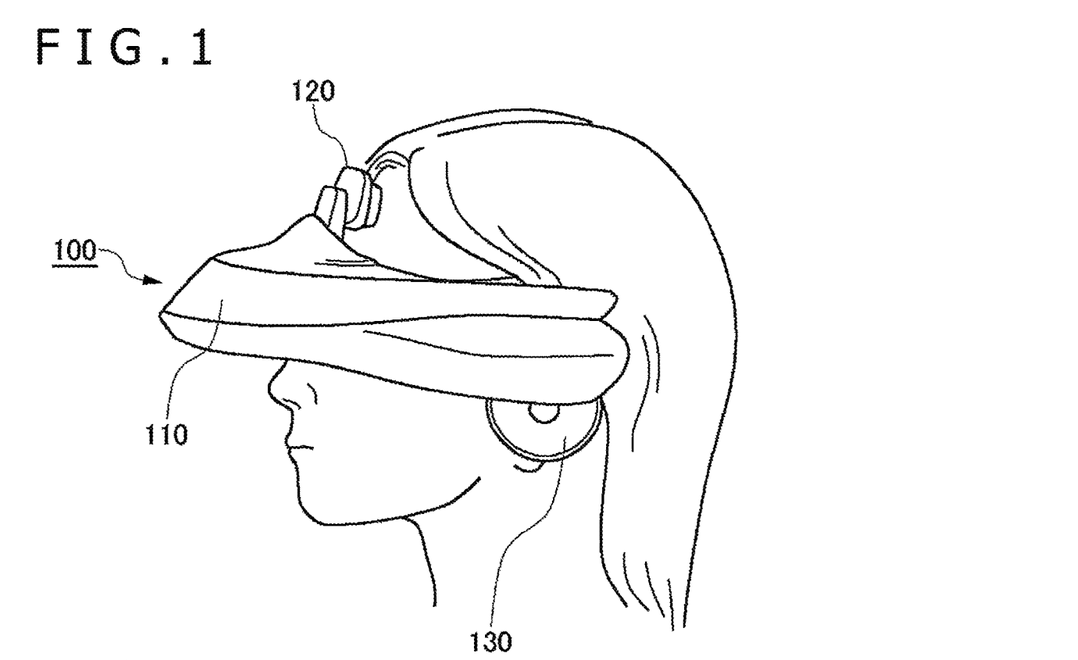
FIG. 1 is an example external view of a head-mounted display according to an embodiment of the present disclosure.

FIG. 1 illustrates an example external view of a head-mounted display 100 according to an embodiment of the present disclosure. The head-mounted display 100 includes a main body section 110, a forehead contact section 120, and a temporal region contact section 130. The head-mounted display 100 is a display device that is worn on the head of a user to allow the user to watch, for example, still images and video images displayed on a display and listen to, for example, sound and music outputted from headphones. A motion sensor built in or externally attached to the head-mounted display 100 is able to make measurements to obtain posture information such as a rotation angle and tilt of the head of the user wearing the head-mounted display 100. Therefore, changing the field of view of a display image in accordance with a motion of the user's head causes the user to feel like as if the user is in an image world.

However, the shape and structure of the head-mounted display according to the present embodiment of the present disclosure are not limited to those depicted in FIG. 1. For example, a camera may be attached to a front surface of the head-mounted display 100 in order to capture an image of a real space as viewed from a user's face. In such a case, analyzing the captured image makes it possible to acquire an orientation of the user's face and a position of the user's head and determine a position of a real item existing ahead. The captured image can also be used as the display image.

Figure 2:
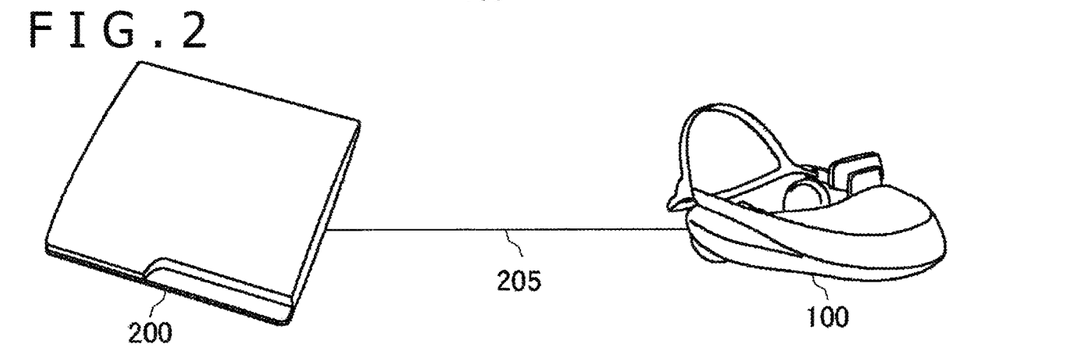
FIG. 2 is a diagram illustrating a configuration of a basic system according to the embodiment.

FIG. 2 is a diagram illustrating a configuration of a basic system according to the present embodiment. The head-mounted display 100 is connected to an image generation device 200 through an interface 205 that is to be connected to a peripheral such as a wireless communication or a universal serial bus (USB) device. The image generation device 200 may be further connected to a server through a network. In such a case, the server may supply, to the image generation device 200, an online application such as a game in which a plurality of users can participate through the network.

The image generation device 200 determines a position of a virtual point of view and a direction of a gaze with respect to the display image in accordance with aa head position and a posture of the user wearing the head-mounted display 100, generates the display image so as to provide a corresponding field of view, and outputs the generated display image to the head-mounted display 100. As far as the image generation device 200 performs the above operations, it may display images for any appropriate purposes. For example, the image generation device 200 may generate a display image representing a virtual world that functions as a stage of an electronic game while it progresses, or display still images and video images for appreciation purposes.

Displaying an omnidirectional (360-degree) image so as to cover a wide angular range centered on a virtual point of view gives a sense of immersion into the image world. The image generation device 200 may be a separate device connected to the head-mounted display 100 through the interface 205 as depicted in FIG. 2 or may be incorporated integrally into the head-mounted display 100.

Figure 3:
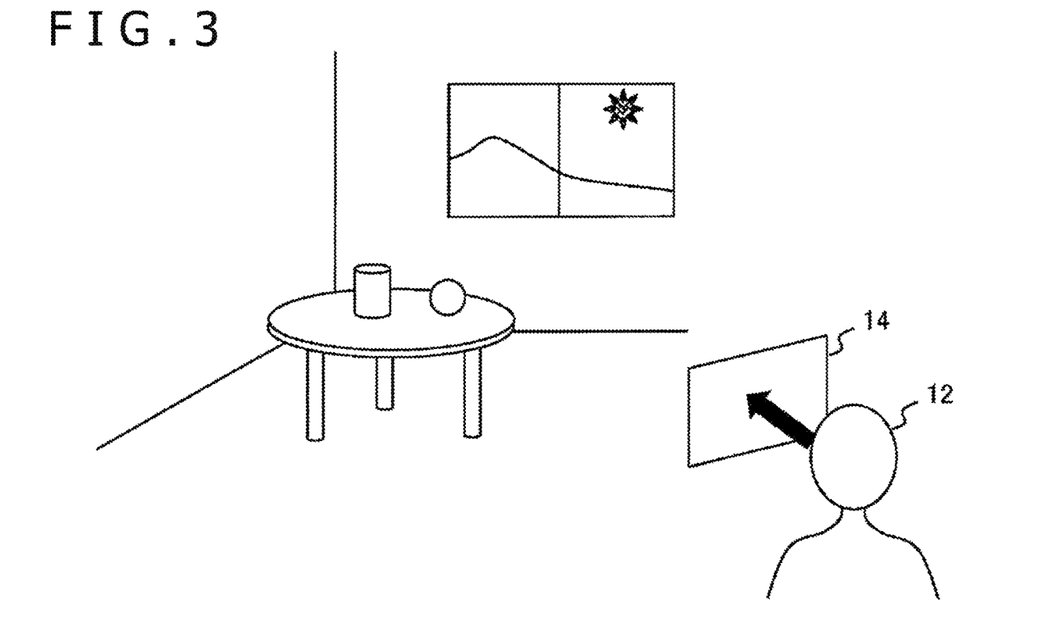
FIG. 3 is a diagram illustrating an example of an image world that is to be displayed on the head-mounted display by an image generation device in the embodiment.

FIG. 3 is a diagram illustrating an example of the image world that is to be displayed on the head-mounted display 100 by the image generation device 200 in the present embodiment. This example represents a state where a user 12 is in a room that is a virtual world. Objects, such as walls, a floor, a window, a table, and items on the table, are disposed in a world coordinate system defining the virtual world, as depicted in FIG. 3. The image generation device 200 defines a view screen 14 in accordance with the position of the point of view of the user 12 and the gaze direction of the user 12 in the world coordinate system, and draws the display image by projecting images of the objects onto the view screen 14.

When the position of the point of view of the user 12 and the gaze direction of the user 12 (hereinafter these may be comprehensively referred to as the "point of view") are acquired at a predetermined rate and a position and an orientation of the view screen 14 are changed accordingly, images can be displayed in a field of view corresponding to the user's point of view. When stereo images having parallax are generated and displayed in front of the left and right eyes of the user 12 by using the head-mounted display 100, a virtual space can also be viewed three-dimensionally. This enables the user 12 to experience virtual reality as if the user 12 is immersed in a room in a display world. The illustrated example assumes that a virtual world based on computer graphics is regarded as a display target. However, the display target may be an image that is obtained by combining computer graphics with a captured image of a real world such as a panoramic photograph.

The above-described technology enables the user 12 to freely walk around in a virtual world. When, for example, a position and a posture of another user existing in the same space as the user 12 are acquired to dispose an object representing an avatar of the other user in a virtual space, the user 12 visually recognizes the other user as a part of the virtual world. This scheme is used to actually utilize a free-roam multiplayer virtual experience attraction. The free-roam multiplayer virtual experience attraction (hereinafter referred to as the "free-roam exhibit") allows a plurality of players to fight and explore together in a virtual space.

Figure 4:
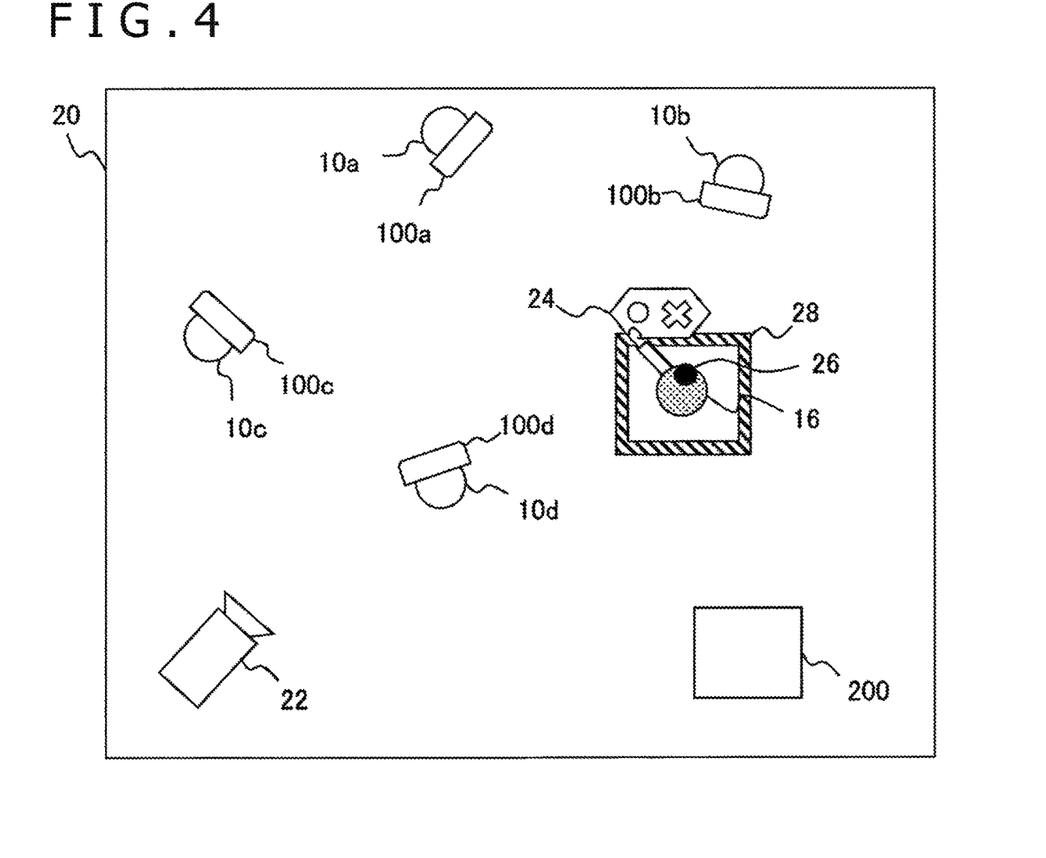
FIG. 4 is a schematic diagram illustrating a play area in a free-roam exhibit to which the embodiment is applicable.

FIG. 4 schematically illustrates a play area in the free-roam exhibit to which the embodiment is applicable. A play area 20 is illustrated so as to overlook a real space where the free-roam exhibit is presented. Players 10a to 10d wearing head-mounted displays 100a to 100d, respectively, exist in the play area 20. However, the number of players is not limited. The image generation device 200 constructs a virtual world as depicted in FIG. 3, and causes the head-mounted displays 100a to 100d worn by the players 10a to 10d to display the virtual world in a field of view corresponding to the point of view of each player.

The position and posture of each of the players 10a to 10d are acquired, for example, by obtaining values measured by motion sensors built in the head-mounted displays 100a to 100d, acquiring images captured by cameras included in the head-mounted displays 100a to 100d, and analyzing the measured values and captured images. Information obtained in this manner can also be used for constructing a virtual world. More specifically, respective objects indicating the movement of the players 10a to 10d are disposed in a virtual world in order to let the players recognize the presence and movement of the other players.

Basically, in the above-described free-roam exhibit, persons other than the players 10a to 10d are not expected to enter the play area. However, it is quite likely that a staff member or a person other than the players is compelled to enter the play area in an attempt to cope with various severities of an unexpected situation such as equipment failure, abnormal physical conditions or injuries of the players, and the loss of personal belongings of the players. In such a situation, the players 10a to 10d viewing only a virtual world including the other players feel the presence of an invisible item and thus become distracted from careful watching or cause an increased risk of collision. Further, it is not practical to interrupt all plays for safety's sake each time a minor incident occurs.

In view of the above circumstances, the present embodiment separately includes a mechanism for detecting visitors other than the players, and causes images viewed by the players 10a to 10d to reflect the presence of such a visitor. A person who is not a player but enters the play area is hereinafter referred to as a "visitor." The visitor is a person who does not wear the head-mounted display 100, that is, a person who sees a real space. The visitor is not to be tracked in an ordinary free-roam system for tracking the position and posture of a player. As far as the visitor is such a person, the purpose of the visitor's entry into the play area and the attribute of the visitor are not specifically limited.

In order to implement the above features, an image display system according to the present embodiment incorporates a sensor 22 and an input device 24 in addition to the image generation device 200 and the head-mounted displays 100a to 100d. The sensor 22 tracks a visitor 16. The input device 24 inputs an operation that is performed to reflect the presence of the visitor 16 in a display image. For example, the visitor 16 wears a marker and a device 26 for generating an ultrasonic wave or light having a predetermined wavelength band, and the sensor 22 tracks the presence and position of the visitor 16 by detecting the ultrasonic wave or the light having the predetermined wavelength band.

Based on the result of such tracking, the image generation device 200 disposes an object representing the visitor 16 at a corresponding position in a virtual world viewed by the players 10a to 10d. Obviously, the object in the virtual world is moved while the visitor 16 is moving. When rules are established to define a position at which the visitor 16 wears the device 26, such as a forward position (a position toward which the visitor faces) of the visitor's head or higher than the visitor's head, or a front surface of the visitor's body, the direction in which the visitor 16 moves can be predicted based on the orientation of the face and body of the visitor 16.

A headgear with the device 26 attached to its front surface may be created and worn by the visitor 16 entering the play area. An alternative is to prepare a mounting fixture with a bar, attach the device 26 to the tip of the bar, allow the visitor 16 to wear the mounting fixture when the visitor 16 enters the play area, and fix the device 26 at a position above the head of the visitor 16. Raising the position of the device 26 reduces the possibility of the device 26 being hidden by the visitor 16 and the players 10a to 10d and thus enables the sensor 22 to achieve stable detection.

The image generation device 200 may allow the players 10a to 10d to determine a direction of travel of the visitor 16 by labeling an object representative of the visitor 16 with the direction of travel of the visitor 16. This enables the players 10a to 10d to intuitively sense the presence of the visitor 16 and naturally act without colliding with the visitor 16. The shape and position of the sensor 22 are not limited to those depicted. The sensor 22 may be mounted, for example, on a ceiling to overlook the interior of a room or may be movable. Alternatively, the sensor 22 may be built in the image generation device 200.

The input device 24 may be a common input device such as a remote controller, a game controller, a mobile terminal, a pushbutton, or a joystick. The input device 24 inputs an operation that determines a time point at which the presence of the visitor 16 is reflected in images viewed by the players 10a to 10d. For example, a stay area 28 of the visitor 16 is clearly marked in the play area 20 in advance, and the visitor 16 entering the stay area 28 operates the input device 24 to input information indicating that the visitor 16 has entered the stay area 28. The input device 24 then receives the inputted information and transmits the received inputted information to the image generation device 200. The image generation device 200 then causes an object to appear in a region within a virtual world viewed by the players 10a to 10d that corresponds to the stay area 28.

As a result, the players 10a to 10d are able to act without entering the stay area 28. Here, the extent, the shape, and the number of the stay area 28 are not limited. For example, the stay area 28 may be, as illustrated, an island type not in contact with the end of the play area 20 or a region in a corner of the play area 20. Alternatively, the stay area 28 may be a passage type that crosses the play area 20. Further, the periphery of the stay area 28 is marked by a luminescent marker or by a periphery-indicating tape attached to a floor in order to let the visitor 16 understand the periphery of the stay area 28 in the real world.

The input device 24 may be operated not only by the visitor 16 but also by, for example, an administrator present outside of the play area 20. The administrator may watch, for example, a surveillance monitor to confirm the entry of the visitor 16 into the stay area 28 and then operate the input device 24. Further, when the visitor 16 exits the stay area 28, the visitor 16 operates the input device 24 to input information indicative of the exit. This causes the image generation device 200 to remove an object representing the stay area 28 from the virtual world.

Introducing the sensor 22 allows the visitor 16 to freely move in the play area 20. Meanwhile, if the place to stay is limited, the visitor 16 should avoid the players, enter the stay area 28, and operate the input device 24. As described above, only one of the sensor 22 and the input device 24 may be introduced in accordance with the action to be taken by the visitor 16.

An alternative is to track a moving visitor 16 by using the sensor 22, reflect the movement of the visitor 16 in an object serving as a visitor's avatar, detect the entry of the visitor 16 into the stay area 28 by using the sensor 22 or the input device 24, and switch an expression to an object representing the stay area. In this case, due to the operation of only the sensor or the collaboration between the sensor 22 and the input device 24, an object indicating the presence of the visitor is continually expressed in different forms. In any case, the image generation device 200 is wiredly or wirelessly connected to both the sensor 22 and the input device 24, and acquires, as needed, information transmitted from both of them.

Figure 5:
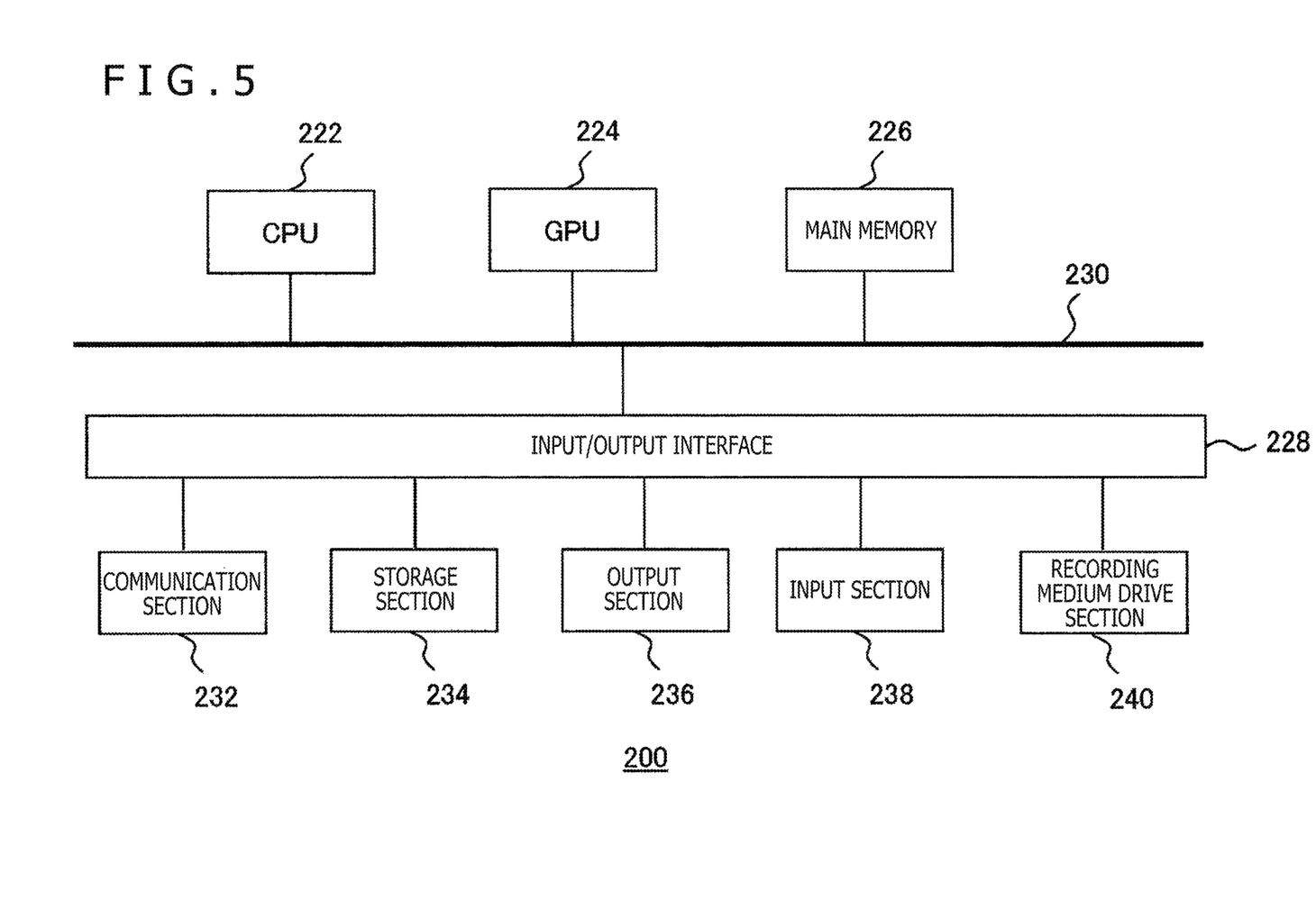
FIG. 5 is a diagram illustrating an internal circuit configuration of the image generation device according to the embodiment.

FIG. 5 illustrates an internal circuit configuration of the image generation device 200. The image generation device 200 includes a central processing unit (CPU) 222, a graphics processing unit (GPU) 224, and a main memory 226. These constituent elements are interconnected through a bus 230. The bus 230 is further connected to an input/output interface 228.

The input/output interface 228 is connected to a communication section 232, a storage section 234, an output section 236, an input section 238, and a recording medium drive section 240. The communication section 232 includes USB, IEEE 1394 (IEEE: Institute of Electrical and Electronics Engineers), and other peripheral device interfaces and a wired or wireless local area network (LAN) interface. The storage section 234 is, for example, a hard disk drive or a nonvolatile memory. The output section 236 outputs data to the head-mounted display 100. The input section 238 inputs data from the head-mounted display 100, the sensor 22, and the input device 24. The recording medium drive section 240 drives a removable recording medium such as a magnetic disk, an optical disc, or a semiconductor memory.

When an operating system stored in the storage section 234 is executed, the CPU 222 exercises overall control of the image generation device 200. Further, the CPU 222 executes various programs that are read from a removable recording medium and loaded into the main memory 226 or downloaded through the communication section 232. The GPU 224 has a function of a geometry engine and a function of a rendering processor, performs drawing processing in accordance with a drawing command from the CPU 222, and stores the display image in an undepicted frame buffer. The GPU 224 then converts the display image stored in the frame buffer to a video signal and outputs the video signal to the output section 236. The main memory 226 includes a random-access memory (RAM) and stores the programs and data to be used for processing.

Figure 6:
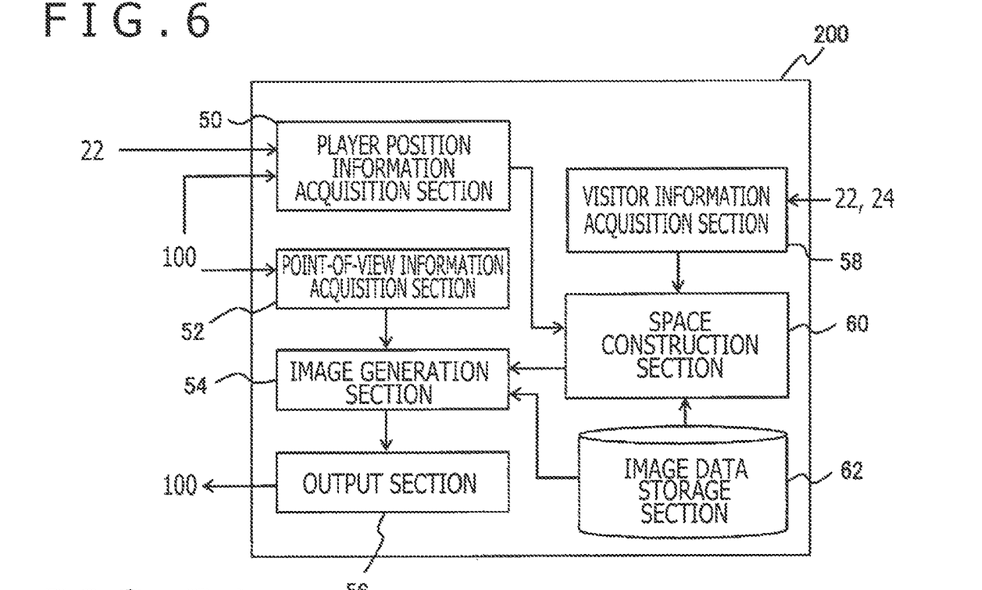
FIG. 6 is a diagram illustrating a configuration of functional blocks of the image generation device in the embodiment.

FIG. 6 illustrates a configuration of functional blocks of the image generation device 200 in the present embodiment. As mentioned earlier, the image generation device 200 may perform general information processing such as causing an electronic game to progress or communicating with a server. However, FIG. 6 particularly focuses on a function of controlling the display image in accordance with a visitor's entry and exit. At least some of the functions of the image generation device 200, which are depicted in FIG. 6, may be implemented in the head-mounted display 100. Alternatively, at least some of the functions of the image generation device 200 may be implemented in a server that is connected to the image generation device 200 through a network.

Further, the functional blocks depicted in FIG. 6 can be implemented by hardware such as the CPU, GPU, memories, or other constituent elements depicted in FIG. 5, or implemented by software including programs for exercising various functions such as a data input function, a data retention function, an image processing function, and a communication function, the programs being loaded from a recording medium or the like into a memory. Therefore, it will be understood by those skilled in the art that the functional blocks may be implemented by hardware alone, by software alone, or by a combination of hardware and software and are not to be limited to any of them.

The image generation device 200 includes a player position information acquisition section 50, a point-of-view information acquisition section 52, a visitor information acquisition section 58, a space construction section 60, an image generation section 54, an image data storage section 62, and an output section 56. The player position information acquisition section 50 acquires information regarding the position of a player in the play area. The point-of-view information acquisition section 52 acquires information regarding the point of view of a user. The visitor information acquisition section 58 acquires information regarding the entry, exit, and position of a visitor. The space construction section 60 constructs a virtual world. The image generation section 54 generates the display image. The image data storage section 62 stores image data to be used for generating the display image. The output section 56 outputs the display image to the head-mounted display 100.

The player position information acquisition section 50 includes, for example, the input section 238 and the CPU 222, which are depicted in FIG. 5, and acquires information regarding the position of each player in the play area at a predetermined rate. The information regarding the position of each player can be obtained by successively acquiring output data from various motion sensors and cameras built in the head-mounted display 100 worn by each player as mentioned earlier and analyzing the acquired output data.

Alternatively, for example, a camera separately disposed in the play area may be used to perform image analysis in order to track the position and posture of a player wearing a luminescent marker of a predetermined color. Another alternative is to attach a device configured to generate, for example, an ultrasonic wave detectable by the sensor 22 to the body of a player. When such an alternative is used, the player position information acquisition section 50 acquires data transmitted from the sensor 22, and determines the position and posture of the player in accordance with the acquired data.

Further, the player position information acquisition section 50 internally retains data defining a normal range of a parameter indicating the posture of a player, and detects a state where the determined posture of the player is outside the normal range. In a case where an ultrasonic wave or light from, for example, a marker worn by a player is detected in order to determine the posture of the player, it is conceivable that the result of player detection may be affected by an approaching visitor. Accordingly, the posture determined based on the result of player detection may be in an abnormal state different from an actual state.

Consequently, the player position information acquisition section 50 detects such a state, and prevents the detected state from being reflected in the posture of an object representing the player. Data indicating, for example, postures assumable at a time by a human and a range of possible movement of a human during a limited period of time is prepared as the data defining the normal range. As regards the data indicating the range of possible movement of a human during a limited period of time, the player position information acquisition section 50 determines, based on posture changes from a previous time step, whether or not the normal range is exceeded.

The point-of-view information acquisition section 52 includes, for example, the input section 238 and the CPU 222, which are depicted in FIG. 5, and acquires information regarding the position of each player's point of view and the gaze direction of each player at a predetermined rate. For example, the point-of-view information acquisition section 52 successively acquires output values from an acceleration sensor built in the head-mounted display 100, and acquires the posture of a player's head in accordance with the acquired output values. The position of the player's head in a real space may be acquired by analyzing an image of a luminescent marker attached to the head-mounted display 100, which is captured by a camera separately disposed in the play area as mentioned earlier.

Alternatively, the position and posture of the head of a player may be acquired by analyzing an image captured by a camera provided for the head-mounted display 100 through the use, for example, of a simultaneous localization and mapping (SLAM) technology. When the position and posture of the player's head are acquired, it is possible to roughly determine the position of the player's point of view and the gaze direction of the player. Further, it will be understood by those skilled in the art that the information regarding the player's point of view can be acquired by various methods. As the processing performed by the player position information acquisition section 50 is similar to the processing performed by the point-of-view information acquisition section 52, the result of processing performed by the point-of-view information acquisition section 52 may be shared by the player position information acquisition section 50.

The visitor information acquisition section 58 includes, for example, the input section 238 and the CPU 222, which are depicted in FIG. 5, and acquires information regarding the presence of a visitor other than players. More specifically, based on data transmitted from the sensor 22, the visitor information acquisition section 58 detects the entry and exit of a visitor, and acquires the position of the visitor in the play area at a predetermined rate. In some cases, based on data transmitted from the input device 24, the visitor information acquisition section 58 detects a visitor's entry into or exit from the stay area previously set in the play area. As mentioned earlier, the visitor information acquisition section 58 may acquire data from one of or both the sensor 22 and the input device 24.

The space construction section 60 includes, for example, the CPU 222 depicted in FIG. 5, and constructs the space of a virtual world to be displayed on the head-mounted display 100. The details of the space to be constructed vary with the purpose of a free-roam exhibit. In any case, the space construction section 60 disposes an object representing a player at a virtual location to be displayed. Players in the virtual world are allowed to visually recognize each other by moving individual objects in accordance with the result of player tracking, which is acquired by the player position information acquisition section 50. In a case where the player position information acquisition section 50 acquires the player's posture as well, the space construction section 60 changes an object's posture as well in accordance with the player's posture.

If it is detected that the calculated posture of a player, which is determined by the player position information acquisition section 50, is outside the normal range, the space construction section 60 locks the posture of the corresponding object in an immediately preceding state. In this instance, the space construction section 60 changes a mode of the locked object, for example, by making the locked object semitransparent or changing the color of the locked object. The display image then causes the other players to understand that temporary measures are taken. When it is detected that the calculated posture has returned to the normal range, the space construction section 60 restores the corresponding object to its previous mode and causes the prevailing posture to be reflected in the corresponding object.

Further, while a visitor is in the play area, the space construction section 60 displays an object indicating the presence of the visitor at a corresponding position in the virtual world. More specifically, when the position of the visitor is being tracked by the sensor 22, the space construction section 60 displays an object that moves in accordance with the movement of the visitor. In such an instance, the space construction section 60 may determine an orientation of the face and body of the visitor in accordance with the result of tracking by the sensor 22, and label the corresponding object with a direction of travel inferred from the determined orientation. For example, the object may be affixed with a pictorial figure indicating the direction of travel. As an alternative, a face of the object may be created to indicate the direction of travel. The space construction section 60 may predict an immediately succeeding direction of travel in accordance with a record of previous movements of the visitor, and causes the result of prediction to be reflected in the object.

Alternatively, in a case where a visitor's entry into and exit from the stay area are detected based on data from the input device 24 or the sensor 22, the space construction section 60 displays an object representing the stay area while the visitor is in the stay area. The image data storage section 62 is implemented, for example, by the main memory 226 depicted in FIG. 5, and stores three-dimensional models, for example, of the virtual world to be constructed by the space construction section 60, player objects, and visitor objects.

The image generation section 54 is implemented, for example, by the CPU 222, the GPU 224, and the main memory 226, which are depicted in FIG. 5, and generates a display image representative of a virtual world at a predetermined rate in a field of view corresponding to the point of view of each player, which is acquired by the point-of-view information acquisition section 52. Stated differently, the image generation section 54 sets a view screen so as to match the point of view of each player, and presents a display image by projecting the virtual world constructed by the space construction section 60 onto the view screen. In a case where stereo images are used to provide a stereoscopic vision, the image generation section 54 generates left- and right-eye images by setting the view screen for each of the left and right eyes.

The output section 56 includes, for example, the CPU 222, the main memory 226, and the output section 236, which are depicted in FIG. 5, and transmits display image data generated by the image generation section 54 to the head-mounted display 100 at a predetermined rate. In a case where the image generation section 54 generates stereo images to provide a stereoscopic vision, the output section 56 generates a display image by joining the generated stereo images as left and right stereo images, and outputs the generated display image. In a case where the head-mounted display 100 is configured for watching a display image through a lens, the output section 56 corrects the display image in consideration of distortion caused by the lens.

Figure 7A:
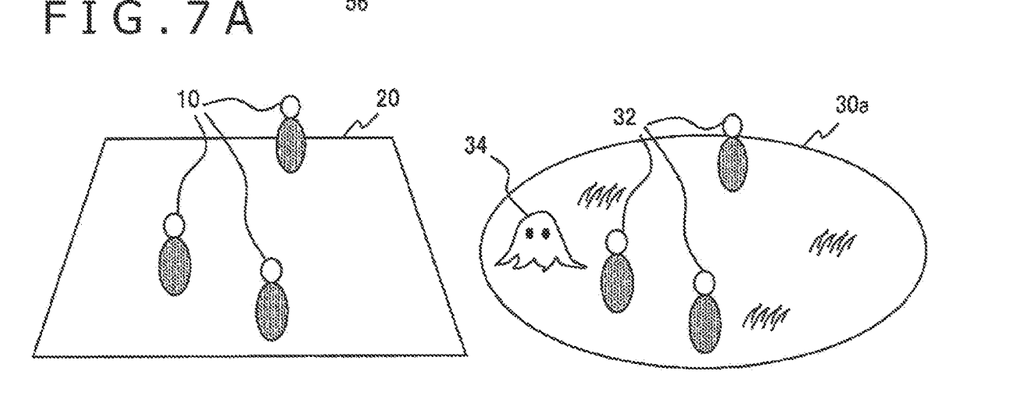
FIGS. 7A and 7B are diagrams illustrating an example of change that a space construction section in the embodiment applies to a virtual world in accordance with the presence of a visitor.

FIGS. 7A and 7B illustrate an example of change that the space construction section 60 applies to a virtual world in accordance with the presence of a visitor. Depicted in FIG. 7A are a real space in which no visitor is in a play area and a virtual world corresponding to the real space. Players 10 exist in the play area 20, which is the real space. Meanwhile, in a virtual world 30a constructed by the space construction section 60, objects 32 representing the respective players 10 are disposed at positions corresponding to those of the players 10.

Figure 7B:
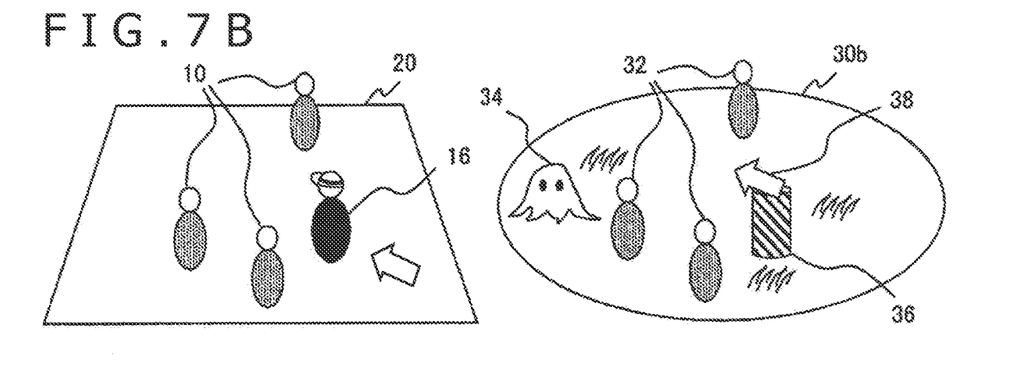

The space construction section 60 moves the objects 32 in accordance with the movement of the players 10. For example, an object 34 representing a character other than the players 10 is disposed as needed in the virtual world 30a. If, in such a situation, a visitor 16 enters the play area 20 as depicted in FIG. 7B, the movement of the visitor 16 is tracked by the sensor 22. The space construction section 60 then causes an object 36 to appear in a virtual world 30b. The object 36 moves in accordance with the movement of the visitor 16.

When a device configured to generate, for example, an ultrasonic wave is attached to the front surface of the body or head of the visitor 16, it is possible to infer the direction of travel of the visitor 16. Therefore, the space construction section 60 attaches a direction object 38 indicative of the direction of travel to the object 36 representing the visitor. As mentioned earlier, the direction of travel may be inferred from the track of movement. Further, in the present example, the direction object 38 is shaped like an arrow indicative of the direction of travel. However, the shape of the direction object 38 is not specifically limited as far as the players are able to recognize the direction. Furthermore, the shapes of the objects representing the visitor or players are not specifically limited. When the object 36 representing the visitor is shaped like a human, the direction of travel of the visitor may be indicated by the orientation of the face of the visitor.

Figure 8A:
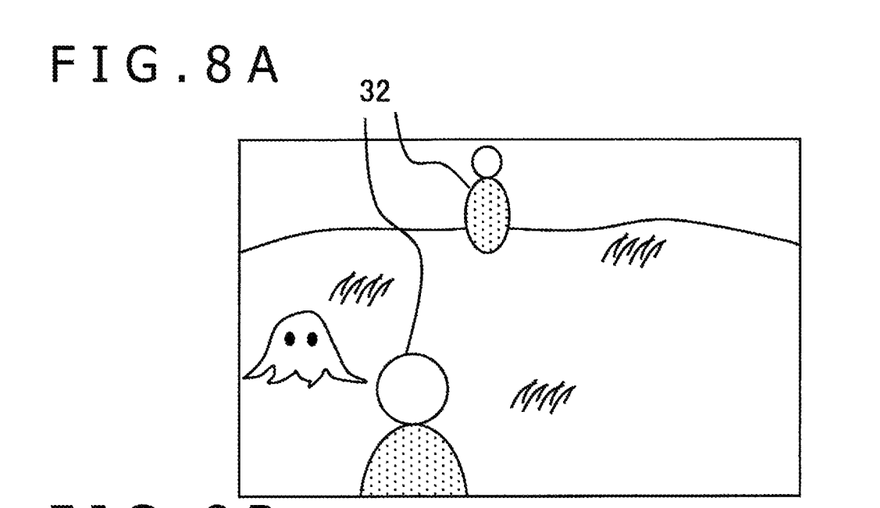
FIGS. 8A and 8B are diagrams illustrating examples of display images that represent the virtual world depicted in FIGS. 7A and 7B in the field of view of a player with an image generation section.
Figure 8B:
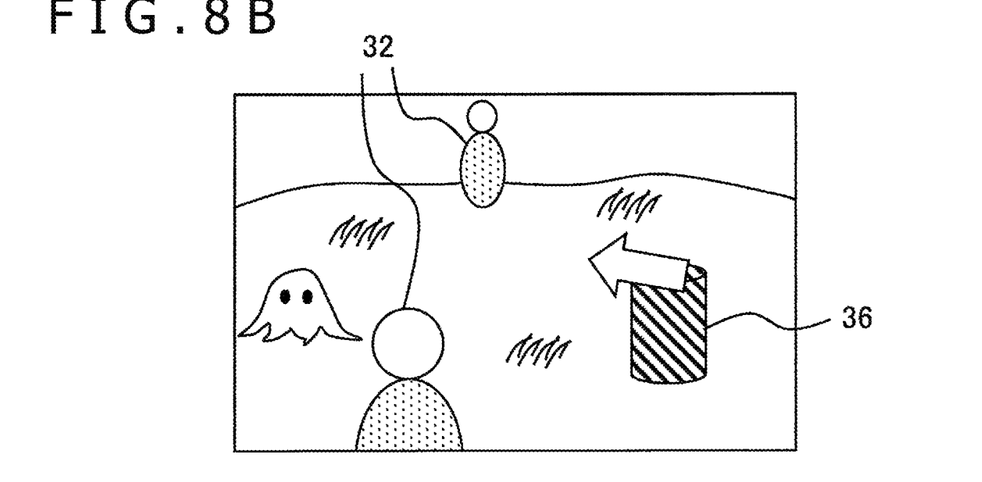

FIGS. 8A and 8B illustrate examples of display images that represent the virtual world depicted in FIGS. 7A and 7B in the field of view of a player with the image generation section 54. Depicted in FIG. 8A is a state where no visitor exists in the play area as depicted in FIG. 7A, and the objects 32 representing the other players are visible in the virtual world. Depicted in FIG. 8B is a state where a visitor exists in the play area as depicted in FIG. 7B, and the objects 32 representing the other players and the object 36 representing the visitor are both visible. When the above-described images are displayed, the players are able to intuitively sense the direction in which the visitor is present and the direction of travel of the visitor, and thus do not feel uncomfortable with or collide with an invisible presence. Further, the sense of immersion will not be reduced because such an invisible presence is recognized as a part of the virtual world.

Figure 9A:
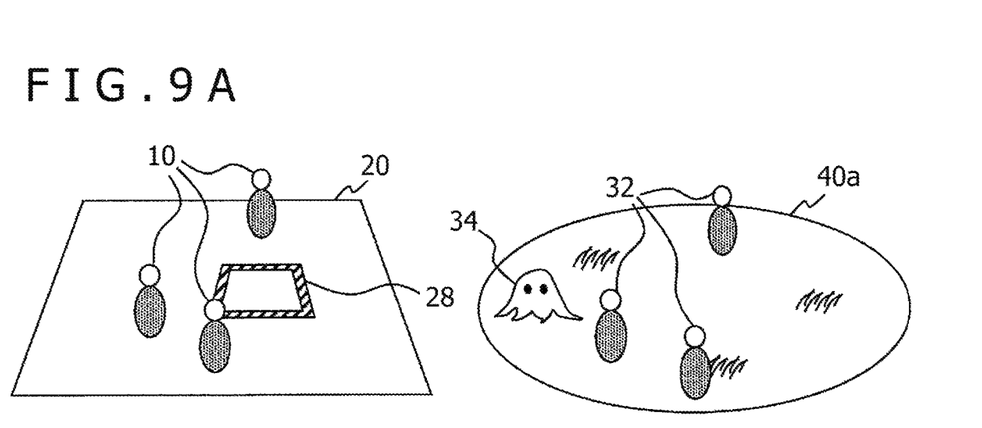
FIGS. 9A and 9B are diagrams illustrating another example of change that the space construction section in the embodiment applies to a virtual world in accordance with the presence of a visitor.

FIGS. 9A and 9B illustrate another example of change that the space construction section 60 applies to a virtual world in accordance with the presence of a visitor. Depicted in FIG. 9A are a real space in which no visitor is in the play area and a virtual world corresponding to the real space. Players 10 exist in the play area 20, which is a real space. In the play area 20 depicted in the present example, the stay area 28 of a visitor is labeled, for example, with a marker or a tape. Meanwhile, in a virtual world 40a constructed by the space construction section 60, objects 32 representing the respective players 10 and an object 34 representing a character other than the players are disposed, as is the case with FIG. 7A.

Figure 9B:
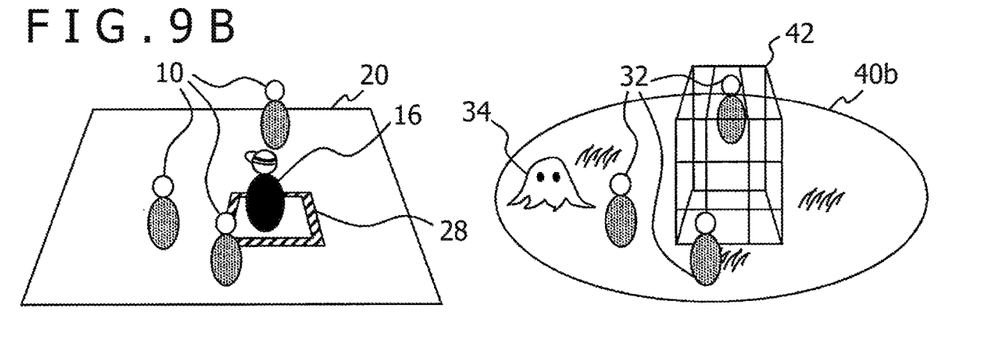

In the above case, too, the space construction section 60 moves the objects 32 in accordance with the movement of the players 10. However, in a state where no visitor exists as illustrated in FIG. 9A, the stay area 28 does not exist in the virtual world 40a, either. If, in such a situation, the visitor 16 enters the stay area 28 as depicted in FIG. 9B and is detected due, for instance, to an operation of the input device 24, the space construction section 60 causes an object 42 representing a region corresponding to the stay area 28 to appear in a virtual world 40b. In the illustrated example, the object 42 is shaped like a fence surrounding the region. However, the shape of the object 42 is not specifically limited as far as the players are able to recognize that they are not allowed to enter the region.

Figure 10A:
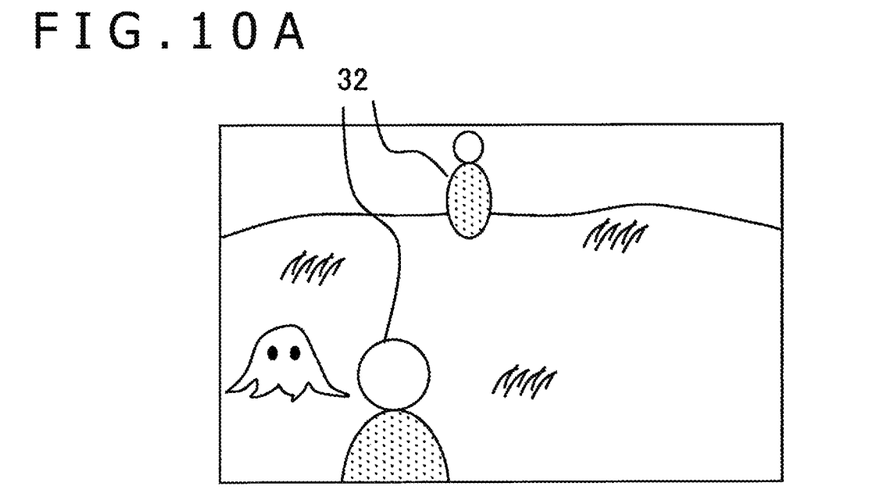
FIGS. 10A and 10B are diagrams illustrating examples of display images that represent the virtual world depicted in FIGS. 9A and 9B in the field of view of a player with the image generation section.

FIGS. 10A and 10B illustrate examples of display images that represent the virtual world depicted in FIGS. 9A and 9B in the field of view of a player with the image generation section 54. Depicted in FIG. 10A is a state where no visitor is in the play area as depicted in FIG. 9A, and the objects 32 representing the other players are visible in the virtual world. Meanwhile, the image depicted in FIG. 10A does not permit the stay area to be visually recognized. Even if a visitor is present in the play area, the same image may be displayed as far as the visitor is not in the stay area. Alternatively, based on the result of tracking by the sensor 22, the object 36 moving in accordance with the movement of the visitor may be displayed as depicted in FIG. 8B.

Figure 10B:
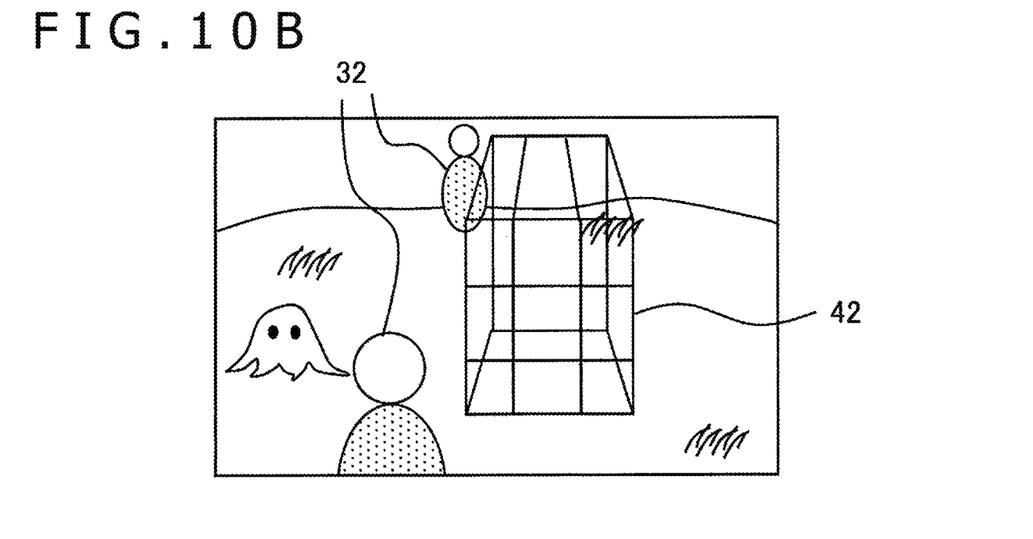

Depicted in FIG. 10B is a state where a visitor is in the stay area as depicted in FIG. 9B, and the objects 32 representing the other players and the object 42 representing a region corresponding to the stay area are both visible. When the above-described images are displayed, the players are able to intuitively sense a region that the players are not allowed to enter, and thus do not feel uncomfortable with or collide with an invisible presence. Further, in this case, too, the sense of immersion will not be reduced because such an invisible presence is recognized as a part of the virtual world.

Figure 11:
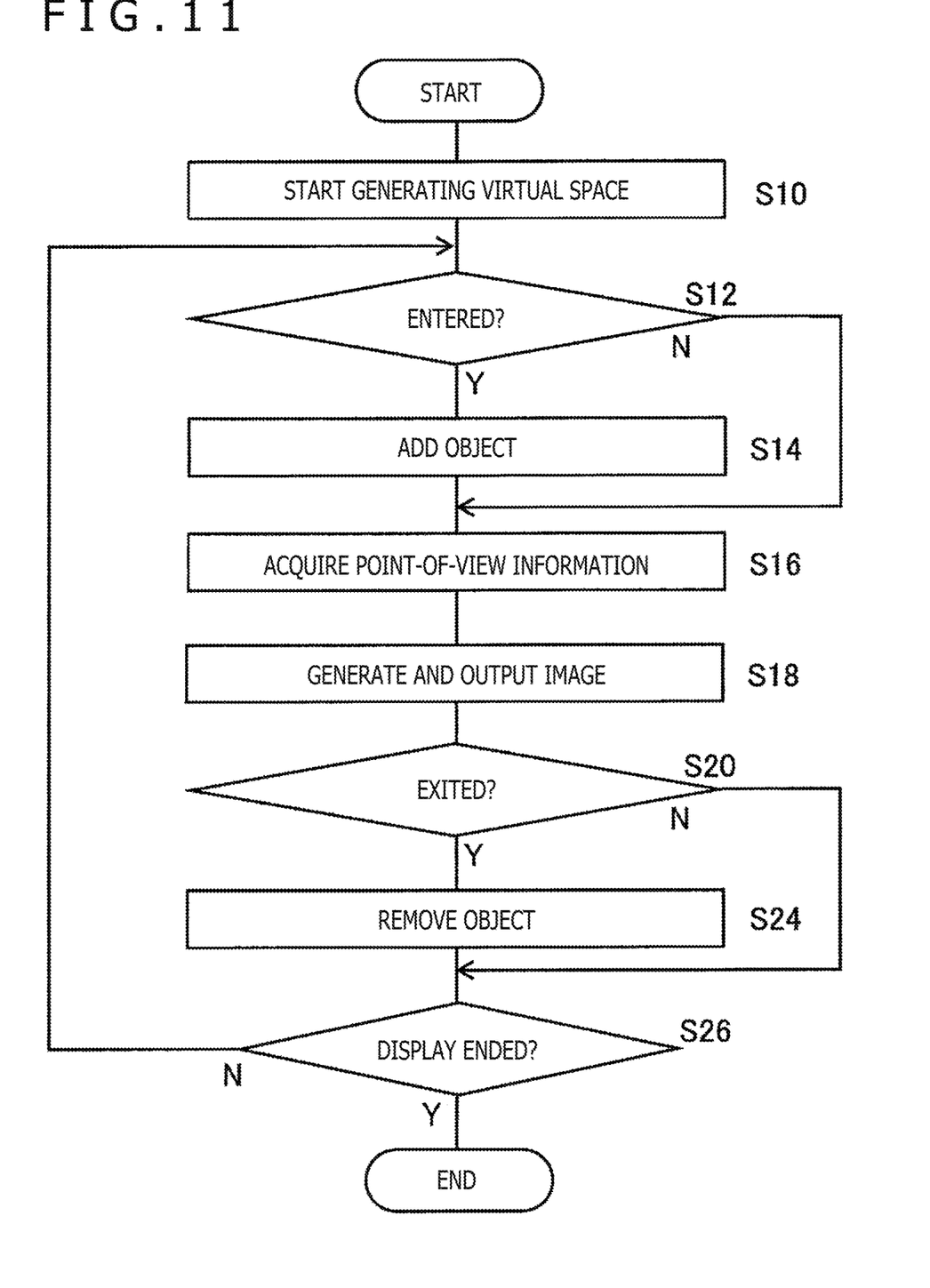
FIG. 11 is a flowchart illustrating processing that is performed by the image generation device according to the embodiment in order to generate a display image and display the generated display image on the head-mounted display.

An operation of the image generation device 200, which is implemented by the above-described configuration, will now be described. FIG. 11 is a flowchart illustrating processing that is performed by the image generation device 200 according to the present embodiment in order to generate a display image and display the generated display image on the head-mounted display 100. The processing depicted in the flowchart starts in a state where a player wears the head-mounted display 100 and the image generation device 200 establishes communication with the head-mounted display 100 and the sensor 22 or with the input device 24. In this state, the head-mounted display 100 transmits, for example, the values measured by the motion sensors to the image generation device 200.

The space construction section 60 then starts generating a virtual world that is to be displayed (step S10). In a case where there are a plurality of players, objects representing the players are included in the virtual world. Subsequently, the space construction section 60 performs a process of moving the objects in accordance with the positions of the players while the processing steps in FIG. 11 are performed. The objects may be moved in accordance with the movement of the players. In this instance, when the posture of a player subjected to a tracking process is outside the normal range, the space construction section 60 applies image effects, for example, by locking the posture of a corresponding object in an immediately preceding state and making the locked object semitransparent. When it is determined that the posture has returned to the normal range, the space construction section 60 restores the object to its previous mode.

If no visitor entering the play area or the stay area is detected ("N" at step S12), the point-of-view information acquisition section 52 acquires the point-of-view information regarding each player (step S16), and the image generation section 54 generates a display image representing a virtual world in a field of view corresponding to the point of view of each player and thus causes the output section 56 to output data on the display image (step S18). When the outputted data is displayed on the head-mounted display 100 of each player, the virtual world depicted, for example, in FIG. 8A or FIG. 10A is visually recognized.

As far as no visitor is present ("N" at step S20) and it is not necessary to end an image display operation ("N" at step S26), the display image from the point of view of each player is successively generated and outputted ("N" at step S12, step S16, and step S18). If a visitor entering the play area or the stay area is detected ("Y" at step S12), the space construction section 60 adds an object indicating the presence of the detected visitor to the virtual world (step S14).

More specifically, in a case where the position of a visitor is being tracked, an object indicating the movement of the visitor is added to the virtual world. When the entry of the visitor into the stay area is detected, an object representing a region corresponding to the stay area is added. When, in this state, the point-of-view information acquisition section 52 acquires the point-of-view information regarding each player (step S16) and the image generation section 54 generates a display image corresponding to the acquired point-of-view information, the output section 56 outputs data on the generated display image (step S18).

When the generated display image is displayed on the head-mounted display 100 of each player, the presence of the visitor is visually recognized as depicted in FIG. 8B and FIG. 10B. As far as the visitor does not exit ("N" at step S20) and it is not necessary to end the image display operation ("N" at step S26), the display image from the point of view of each player is successively generated and outputted ("N" at step S12, step S16, and step S18). However, if a new visitor enters the play area or enters another stay area ("Y" at step S12), an object indicating the presence of the new visitor is further added to the virtual world (step S14).

Meanwhile, if it is detected that a visitor in the play area or the stay area has exited ("Y" at step 20), the space construction section 60 removes an object indicating the presence of the visitor from the virtual world (step S24). As far as it is not necessary to end the image display operation ("N" at step S26), steps S12 to S24 are repeated by branching as needed between relevant steps. When it becomes necessary to end the image display operation ("Y" at step S26), the whole processing ends.

The stay area in the present embodiment may be used not only as a visitor's shelter but also as a player's shelter. More specifically, a player in a poor physical condition or feeling tired in the middle of a play may use the stay area as a shelter where the player is not interfered with by another player. As mentioned earlier, the stay area labeled within the play area is not visually recognized by the players under normal conditions. Therefore, the space construction section 60 or the image generation section 54 operates in such a manner that a pictorial figure indicating a direction toward the stay area as viewed from a relevant player is depicted in the virtual world or in the display image.

Figure 12A:
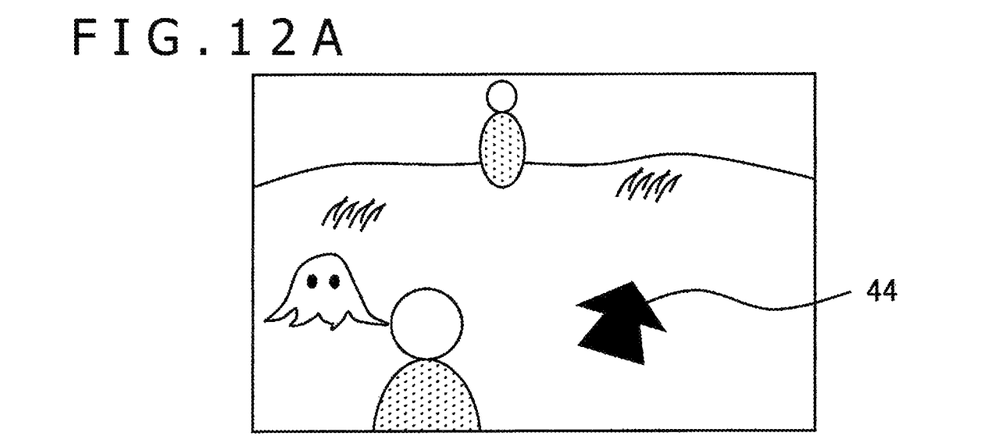
FIGS. 12A and 12B are diagrams illustrating examples of display images that the image generation section generates in a case where a stay area set in accordance with the embodiment is used as a player's shelter.

FIGS. 12A and 12B illustrate examples of display images that the image generation section 54 generates in a case where the stay area set in accordance with the embodiment is used as a player's shelter. Depicted in FIG. 12A is an image displayed on the head-mounted display 100 of a player who wants to take shelter in the stay area. When a player is placed in a situation where the player wants to take shelter, the player indicates such a situation by performing an input operation with an undepicted input device possessed by the player or with the head-mounted display 100 that moves based on the motion of the head of the player. Accordingly, the image generation section 54 operates in such a manner that a pictorial figure 44 guiding the player to the stay area appears within the image to be displayed on the head-mounted display 100 of the player.

In the present example, the pictorial figure 44 is shaped like an arrow indicating a direction toward the stay area. However, the shape of the pictorial figure 44 is not specifically limited as far as the player is able to recognize the direction toward the stay area. The pictorial figure 44 may be depicted in the virtual world by the space construction section 60, or may be superimposed on a displayed image by the image generation section 54. The player position information acquisition section 50 detects that the player has moved in accordance with the pictorial figure 44 and entered the stay area. In such an instance, the space construction section 60 causes an object representing a region corresponding to the stay area to appear in the virtual world, as is the case with a visitor.

Figure 12B:
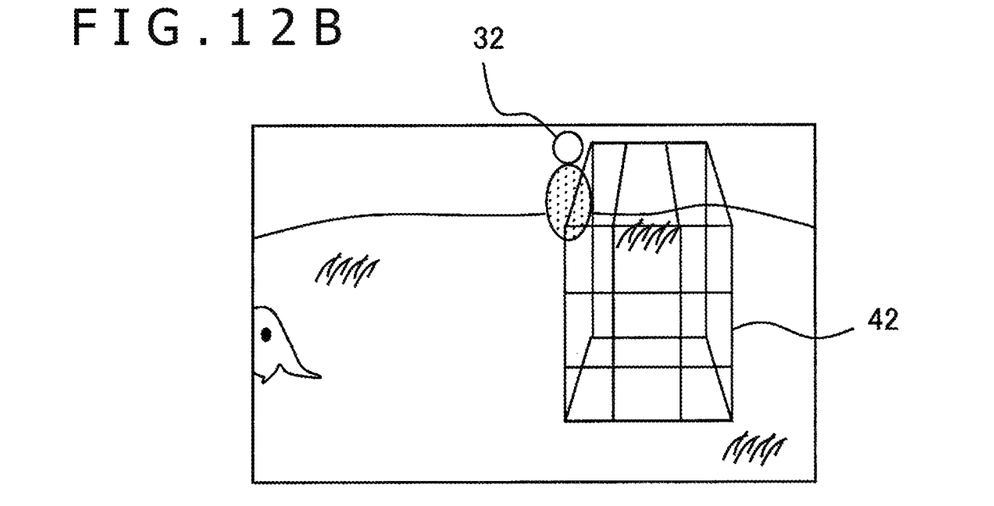

Depicted in FIG. 12B is an image that is displayed on the head-mounted display 100 of another player in the resulting situation. In this instance, too, the object 42 representing a region corresponding to the stay area is displayed as is the case with FIG. 10B. This enables the other player to intuitively sense a region that cannot be entered, and thus avoid interfering with a sheltered player. The image displayed on the head-mounted display 100 of the sheltered player is changed in a predetermined manner at the time point of entry into the stay area in order to notify the sheltered player of the entry into the stay area.

Subsequently, if, for example, a visitor enters, as needed, the same stay area as the sheltered player and then exits together with the sheltered player, and such a situation is detected by the player position information acquisition section 50 or the visitor information acquisition section 58, the space construction section 60 removes the object 42 so as to return to a normal state. Alternatively, when a problem encountered by the sheltered player is solved, the sheltered player is able to exit the stay area and return to a play. In such a case, too, the space construction section 60 removes the object 42 from the virtual world at a time point at which the sheltered player exits the stay area.

In a free-roam exhibit where a player uses a head-mounted display to walk around in a virtual world, the present embodiment, which has been described above, detects a person other than the player has entered a play area and causes the presence of such a detected person to be reflected in an image displayed on the head-mounted display of the player. More specifically, the present embodiment tracks the position of a visitor by attaching a sensor-detectable device to the visitor and allowing a sensor to detect the sensor-detectable device. In this case, the present embodiment causes an object representing the visitor to appear in the virtual world.

An alternative is to set a dedicated stay area in the play area and use, for example, an input device to detect, for instance, a visitor entering the dedicated stay area. In this case, the present embodiment causes an object representing a region corresponding to the dedicated stay area to appear while the visitor is present in the stay area. In either of the above cases, the present embodiment enables even a player viewing only the virtual world to intuitively sense the presence of a visitor and prevents the player from feeling uncomfortable with the intuitively sensed presence of the visitor and from colliding with the visitor.

Further, the present embodiment is able to recognize even such a sudden event as a part of the virtual world. This enables the player to continue playing without losing the sense of immersion. Furthermore, when a player having a problem during a play is guided to the stay area and an object representing the player is made to appear in a similar manner, the present embodiment enables the player to address the problem without interfering with another player. Moreover, when the result of player detection is affected by a visitor and a calculated posture is detected to be abnormal, the present embodiment prevents the calculated posture from being reflected in a corresponding object. This makes it possible to minimize the influence of the presence of a visitor on a play.

While the present disclosure has been described in conjunction with an embodiment, it will be understood by those skilled in the art that the embodiment is illustrative and not restrictive, and that the combination of constituent elements and individual processes in the embodiment may be variously modified, and further that such modifications also fall within the scope of the present disclosure.

What is claimed is:

1. An image generation device comprising:
    a space construction section that constructs a virtual world to be displayed on a head-mounted display;
    an image generation section that generates, based on a position and a posture of a head of a player wearing the head-mounted display, a display image representing the virtual world in a field of view corresponding to a point of view of the player, and causes the head-mounted display to display the generated display image; and
    a visitor information acquisition section that acquires information regarding presence of a visitor without a head-mounted display in a space where the player and the visitor are able to move,
    wherein, only while the visitor is present within the space, the space construction section displays a first object in the virtual world corresponding to the visitor,
    wherein the object is displayed at a position in the virtual world corresponding to a location of the visitor in the space.

2. The image generation device according to claim 1, wherein the visitor information acquisition section acquires information regarding a position of the visitor in accordance with a result of detection by a sensor, the sensor detecting an ultrasonic wave or light having a predetermined color, the ultrasonic wave or the light having a predetermined color being generated from a device worn by the visitor,
    wherein the sensor is located at a fixed position.

3. The image generation device according to claim 1,
    wherein the visitor information acquisition section predicts a direction of travel of the visitor, and
    the space construction section displays a second object moving in addition to the first object in accordance with a movement of the visitor as the object indicating the presence of the visitor, and labels the second object with the direction of travel.

4. The image generation device according to claim 1,
    wherein the visitor information acquisition section detects the visitor's entry into and exit from a stay area preset in the space, and
    while the visitor is present in the stay area, the space construction section displays an object surrounding a region corresponding to the stay area as the object indicating the presence of the visitor,
    wherein the stay area is a sub-area of the space represented in the virtual space at a corresponding location.

5. The image generation device according to claim 4, wherein the visitor information acquisition section detects the visitor's entry into and exit from the stay area through an input device operated by the visitor or a person outside the space.

6. The image generation device according to claim 4,
    wherein, when an input operation is performed by the player to indicate that the player wants to take shelter, the image generation section displays a pictorial figure for guiding the player to the stay area in the display image on a head-mounted display worn by the player, and
    the space construction section displays the object surrounding the region corresponding to the stay area even while the player is present in the stay area.

7. The image generation device according to claim 1, further comprising:
    a player position information acquisition section that acquires information regarding the position and the posture of the player, and detects a state where the posture indicated by the acquired information is outside a predefined normal range,
    wherein the space construction section displays an object representing the posture of the player at a corresponding position in the virtual world, and when the posture is outside the normal range, locks the object and changes a mode of the locked object, the posture of the player being determined based on the information acquired by the player position information acquisition section.

8. An image display system comprising:
    an image generation device including
    a space construction section that constructs a virtual world to be displayed on a head-mounted display,
    an image generation section that generates, based on a position and a posture of a head of a player wearing the head-mounted display, a display image representing the virtual world in a field of view corresponding to a point of view of the player, and causes the head-mounted display to display the generated display image, and
    a visitor information acquisition section that acquires information regarding presence of a visitor without a head-mounted display in a space where the player and the visitor are able to move, while the visitor is present in the space, the space construction section displaying an object in the virtual world corresponding to the visitor, wherein the object is displayed at a position in the virtual world corresponding to a location of the visitor in the space;

the head-mounted display that displays an image outputted from the image generation device; and a sensor located at a fixed position that detects the visitor and transmits data on the visitor to the image generation device.

9. An image display system comprising:

an image generation device including a space construction section that constructs a virtual world to be displayed on a head-mounted display, an image generation section that generates, based on a position and a posture of a head of a player wearing the head-mounted display, a display image representing the virtual world in a field of view corresponding to a point of view of the player, and causes the head-mounted display to display the generated display image, and a visitor information acquisition section that acquires information regarding presence of a visitor without a head-mounted display in a space where the player and the visitor are able to move, while the visitor is present, the space construction section displaying an object in the virtual world corresponding to the visitor, wherein the object is displayed at a position in the virtual world corresponding to a location of the visitor in the space the visitor information acquisition section detecting the visitor's entry into and exit from a stay area preset in the space, wherein the stay area is a sub-area of the space represented in the virtual space at a corresponding location, while the visitor is present in the stay area, the space construction section displaying an object surrounding a region corresponding to the stay area as the object indicating the presence of the visitor;

the head-mounted display that displays an image outputted from the image generation device; and an input device that inputs an operation indicative of the visitor's entry into and exit from the stay area, and transmits information regarding the visitor's entry into and exit from the stay area to the image generation device.

10. An information presentation method of an image generation device, comprising:

constructing a virtual world to be displayed on a head-mounted display;

generating, based on a position and a posture of a head of a player wearing the head-mounted display, a display image representing the virtual world in a field of view corresponding to a point of view of the player, and causing the head-mounted display to display the generated display image;

acquiring information regarding presence of a visitor without a head-mounted display in a space where the player and the visitor are able to move; and displaying an object in the virtual world corresponding indicating the presence of the visitor while the visitor is present within the area, wherein the object is displayed at a position in the virtual world corresponding to a location of the visitor in the space.

* * * * *